United States Patent [19]

Suzuki et al.

[11] Patent Number: 4,571,314

[45] Date of Patent: Feb. 18, 1986

[54] PROCESS FOR PRODUCING SUBSTRATE FOR OPTICAL RECORDING MEDIUM

[75] Inventors: Setsuo Suzuki, Yokohama; Koji Morishita, Zushi; Yushi Sakamoto, Yokohama, all of Japan

[73] Assignee: Sumitomo Bakelite Company Limited, Tokyo, Japan

[21] Appl. No.: 664,018

[22] Filed: Oct. 23, 1984

[30] Foreign Application Priority Data

Jul. 4, 1984 [JP] Japan ............................ 59-137250

[51] Int. Cl.$^4$ ............................................. B29D 11/00
[52] U.S. Cl. ............................................. 264/1.7; 264/2.5; 264/106; 264/219; 264/261; 264/337; 428/64; 428/414; 430/271; 430/273
[58] Field of Search ............... 264/1.1, 1.4, 1.7, 2.5, 264/219, 337, 338, 106, 107, 261; 425/810; 430/271, 273; 428/64, 414

[56] References Cited

U.S. PATENT DOCUMENTS

| | | | |
|---|---|---|---|
| 3,629,388 | 12/1971 | Wolfe et al. | 264/337 |
| 4,199,421 | 4/1980 | Kamada et al. | 264/1.4 |
| 4,374,077 | 2/1983 | Kerfeld | 264/1.4 |

FOREIGN PATENT DOCUMENTS

| | | | |
|---|---|---|---|
| 0088503 | 6/1982 | Japan | 264/106 |
| 0153608 | 9/1983 | Japan | 264/338 |

*Primary Examiner*—Donald Ozaja
*Assistant Examiner*—Mary Lynn Fertig
*Attorney, Agent, or Firm*—Sheridan Neimark; Karl W. Flocks

[57] ABSTRACT

A process for producing a substrate for optical recording medium (optical disk recording medium), which comprises coating at least one inner surface of a casting mold with a radiation-curable or thermosetting resin, curing the resin to form a coating film on the mold surface or surfaces, casting into the mold an epoxy resin composition comprising an alicyclic epoxy resin or a mixture of an alicyclic epoxy resin and an aromatic epoxy resin, an organic polybasic acid anhydride, a curing accelerator and an anti-discoloring (anti-oxidative) agent, curing the epoxy resin composition to transfer the coating film of the mold to the surface of the cured product of the epoxy resin composition, thereby forming a double or triple layer cast laminate. The above casting mold may have a mold-releasing film on the inner surfaces and the coating film may be formed on this mold-releasing film.

7 Claims, No Drawings

PROCESS FOR PRODUCING SUBSTRATE FOR OPTICAL RECORDING MEDIUM

BACKGROUND OF THE INVENTION

1. Field of the Invention

This invention relates to a process for producing a substrate for optical recording medium (optical disk recording medium) which has excellent resistance to abrasion or scratching, resistance to steam-permeation and adhesion to an information-recording layer, comprising forming a surface-hardened layer on the surface of a cast-cured product of an epoxy resin composition simultaneously with the casting of the epoxy resin composition.

1. Description of the Prior Art

The substrate which has heretofore been used in such an optical recording medium is a glass plate or a transparent synthetic resin plate, and there has been used a material which is optically isotropic in order to satisfy the requirement that the substrate be free from double refraction (birefringence). The transparent synthetic resin plate has been a molded article of polymethyl methacrylate (PMMA), polysulfone (PS), polycarbonate (PC), polyvinyl chloride (PVC), a copolymer of vinyl chloride and vinyl acetate or the like.

At present, a PMMA substrate formed by injection molding is in most cases used in view of moldability and optical transparency.

However, in the case of PMMA substrate, the enhancement of recording density is required, and the following disadvantages have become a great problem because high reliability of medium is required:

(a) It is inferior in thermal resistance, so that when the temperature of the surface of the substrate rises when vapor-depositing various functional films thereon, the guide groove becomes flat and unsatisfactory.

(b) It has a great moisture absorption, and therefore, deformation due to moisture absorption occurs and oxidation of the functional film becomes accelerated.

(c) Since the substrate is prepared by injection molding, stress due to the molding operation and double refraction appears.

(d) The substrate surface is inferior in resistance to abrasion or scratching, and when producing an optical recording medium from the substrate, or after the production process, the substrate tends to be flawed, which becomes a source of noise, and therefore, the resulting optical recording medium is inferior in reliability.

Moreover, the surface hardness of a substrate for optical recording medium consisting of a cast-cured product of an epoxy resin composition comprising an alicyclic epoxy resin or a mixture thereof with an aromatic epoxy resin, an organic polybasic acid anhydride, a curing accelerator and an anti-discoloring (anti-oxidative) agent is substantially the same as that of PMMA, and therefore, the surface of the substrate tends to be flawed. Therefore, said substrate as such is not satisfactory.

It has been considered that if at least the surface of a substrate for optical recording medium which is exposed to a laser light is subjected to a surface-hardening treatment, an optical recording medium excellent in handling could be obtained.

Moreover, it has also been considered that if one surface or both surfaces of a substrate for optical recording medium are subjected to surface-hardening treatment, the surfaces could be prevented from being flawed in the step of forming a functional film of tellurium or bismuth and the adhesion between the surface and the functional film could be enhanced.

According to a conventional method for the surface-hardening treatment, however, a surface-hardened layer of an organic compound has been applied directly to the surface of a substrate of PMMA or PC obtained by injection molding, by a spinner method, a dipping method or a roll-coater method.

In general, the conventional surface-hardening treatment has been conducted as follows: A substrate for optical recording medium is first prepared by casting, then taken out of the mold and thereafter subjected to a surface-hardening treatment. However, such a method has the disadvantage that the surface of the substrate exposed and therefore is subjected to the danger of becoming damaged.

SUMMARY OF THE INVENTION

In order to solve the above various problems simultaneously, the present inventors have conducted extensive research on a process for applying a hard coat to a cast-cured product to be used as a substrate for optical recording medium without encountering the danger that the surface of the cured product becomes flawed during handling of the cured product.

According to the present invention, there is provided a process for producing a substrate for optical recording medium, which comprises coating at least one inner surface of a casting mold with a radiation-curable or thermosetting resin, curing the resin to form a coating film on the mold surface or surfaces, casting into the mold an epoxy resin composition comprising an alicyclic epoxy resin or a mixture of an alicyclic epoxy resin and an aromatic epoxy resin, an organic polybasic acid anhydride, a curing accelerator and an anti-discoloring (anti-oxidative) agent, and heat-curing the epoxy resin composition to transfer the coating film on the mold to the surface of the cured product of the epoxy resin composition, thereby forming a double or triple layer cast laminate.

DETAILED DESCRIPTION OF THE INVENTION

In this invention, there may be used any radiation-curable resin or thermosetting resin which can form a cured film having a pencil hardness of 4H or more, and said resin includes oligomers such as epoxy acrylate, urethane acrylate, polyester acrylate, polyether acrylate. This resin is preferably used in solution in a polyfunctional acrylate monomer, and said oligomer is of an ultraviolet-curable type. These resins may be used in admixture of two or more, and in this case, a coat free from unevenness can be obtained in some cases.

Thermosetting resins which can form a high hardness resin coating film such as silicone resin, melamine resin, polyimide resin or the like may be used appropriately.

A method may also be properly used which comprises diluting the above resin with a solvent, applying the resulting solution on the inner surface of the casting mold and then curing the resin to form a cured coating film on the inner surface of the mold.

The bonding strength between the cured product of the resin and the casting mold is generally weak, but it can be adjusted appropriately by selecting the kind of the resin for the cured coating film.

It is preferable to use a photoinitiator having a good sensitivity in a relatively long wavelength region such as 4'-isopropyl-2-hydroxy-2-methylpropyophenone, 2,2-dimethoxy-2-phenylacetophenone, benzoin isobutyl ether, 1-hydroxyhexyl phenyl ketone or the like alone or in combination of two or more.

For the purpose of imparting toughness, a polythiol compound may be added to the resin for the cured coating film in a proportion of 20 to 10 parts by weight, preferably about 5 parts by weight, per 100 parts by weight of the resin. When the proportion exceeds 10 parts by weight, the thermal resistance, hardness, glass transition temperature and the like are adversely affected. Moreover, a stabilizer, an anti-discoloring agent and the like may be added, if necessary, to the resin for the cured coating film.

The radiation-curable resin or thermosetting resin for the surface-cured coating is applied to the substrate by a conventional method such as spinner method, dipping method, roll-coated method or the like, and then subjected, as it is, or after removal of solvent, to irradiation or heating to cure the coating film.

The thickness of the cured coating layer is preferably 5 to 15 μ, and if the thickness is less than 5 μ there is a possibility of insufficient curing due to the oxygen-prohibiting effect. If the thickness is more than 15 μ there is a fear of double refraction of a laser from an optical point of view.

The index of refraction of said cured coating layer is preferably as close as possible to that of the epoxy resin composition comprising the alicyclic epoxy resin or a mixture of the aromatic epoxy resin and the alicyclic epoxy resin.

According to the above method, a substrate for an optical recording medium having transferred thereto a cured coating film having a pencil hardness of 4H or more can be produced by subjecting at least one side of a casting mold to a surface-hardening treatment, and castcuring the said epoxy resin composition in the resulting coated mold.

When obtaining a transparent substrate according to the method of this invention, only one surface of the casting mold or both surfaces may be subjected to the coating film-treatment of this invention if only one surface, then the surface-hardening coating film can be transferred to only one side of the transparent substrate. If the two facing surfaces of the casting mold are subjected to coating treatment, both surfaces of the resulting transparent substrate comes to have the surface-hardened coating films transferred from the surfaces of the casting mold, and hence, it is very easy to impart a surface-hardened coating film to both the surfaces of the transparent substrate. Moreover, when transferring a surface-hardened coating film to both the surfaces of the transparent substrate, the same kind of resin or different kinds of resins may be used for the two surfaces. That is, a radiation-curable resin may be used for one surface and a thermosetting resin may be used for the other surfaces. Even in this case, no change is required for the cast-laminating step, and the desired substrate can be produced in the same manner. This is advantageous.

In the cast-laminating step, the selection of resins for the surface-hardened coating film to be transferred makes it unnecessary to treat the surface of the casting mold with a releasing film in some cases.

DESCRIPTION OF THE PREFERRED EMBODIMENTS

Example 1

A glass plate was coated with a radiation-curable resin having the following recipe uniformly by a dipping method:

| Recipe | Parts by weight |
| --- | --- |
| Dipentaerythritol hexaacrylate | 100 |
| 4'-Isopropyl-2-hydroxy-2-methyl-propiophenone | 4 |
| Isopropyl alcohol | 400 |
| Toluene | 100 |
| Leveling agent | 0.4 |

The coated plate was then dried at 70° C. for 10 minutes and irradiated with ultraviolet rays from a high pressure mercury lamp to form a coating film having a thickness of 5 μ on the glass plate. This coating film was intimately contacted with the glass surface and was easily removed by use of cellophane tape.

Two sheets of the glass plate having formed thereon the coating film were placed so that the coating films faced each other, and the three sides of the plates were sealed with a spacer to prepare a casting mold, and an epoxy resin composition having the following recipe was cast into the mold and cured at 100° C. for 3 hours:

| Recipe | Parts by weight |
| --- | --- |
| Alicyclic epoxy resin [3,4-epoxy-cyclohexylmethyl 3,4-epoxycyclo-hexanecarboxylate] | 100 |
| 1,5-Propanediol | 3 |
| Methylhexahydrophthalic anhydride | 122 |
| Stabilizer | 10 |
| 1,8-Diazabicyclo[5,4,0]undecene-7 2-ethylhexylcarboxylic acid salt | 6 |

The cured product was released from the mold, to obtain a laminated transparent substrate having transferred thereto a coating film of the radiation-curable resin.

The pencil hardness of the surface of the transparent substrate was 6H or more, and the surface thereof was excellent in resistance to abrasion or scratching, and no scratches were found when the surface was rubbed 100 times with steel wool.

Example 2

In the same manner as in Example 1, a coating film of the radiation-curable resin was formed on a glass plate, and a MgF2 releasing film was formed on another glass plate free from the coating film of a radiation-curable resin. Using the two glass plates, a casting mold was prepared in the same manner as in Example 1, and an epoxy resin composition having the following recipe was cast into the mold and cured to obtain a transparent substrate consisting of a cast-laminated product having the coating film of a radiation-curable resin on one side:

| Recipe | Parts by weight |
| --- | --- |
| Alicyclic epoxy resin [3,4-epoxy-6-methylcyclohexylmethyl 3,4-epoxy-6-methylcyclohexanecarboxylate] | 100 |
| Methylhexahydrophthalic anhydride | 103 |
| 1,8-Diazabicyclo[5,4,0]undecene-7 2-ethylhexylcarboxylic acid salt | 4.0 |
| 2,6-Di-tertiary butyl-p-cresol | 1.0 |

The transparent substrate thus obtained had the same characteristics as those in Example 1.

Example 3

A glass plate was coated uniformly with a radiation-curable resin having the following recipe by a dipping method:

| Recipe | Parts by weight |
| --- | --- |
| Dipentaerithrytol hexaacrylate | 50 |
| Tetramethylol methanetetraacrylate | 50 |
| 1-Hydroxyhexyl phenyl ketone | 4 |
| Isopropyl alcohol | 400 |
| Toluene | 100 |
| Leveling agent | 0.4 |

The coating film was dried at 70° C. for 10 minutes and then irradiated with ultraviolet rays from a high pressure mercury lamp to form a coating film having a thickness of 5 $\mu$ on the glass plate. This coating film was intimately contacted with the surface of glass but was easily removed by means of a cellophane tape.

Subsequently, two sheets of the glass plate having formed thereon the above coating film were placed so that the coating films faced each other and the three sides of the plate were sealed with a spacer to prepare a casting mold, an epoxy resin composition prepared by mixing the following epoxy resin compositions A and B in a weight ratio of 1:1 was cast into the mold and cured to obtain a transparent substrate consisting of a cast-laminated product having the coating film of a radiation-curable resin transferred from the mold on both sides:

| Epoxy resin composition A | Parts by weight |
| --- | --- |
| Bisphenol A type epoxy resin | 100 |
| Methylhexahydrophthalic anhydride | 88 |
| 2-Ethyl-4-methylimidazole | 0.5 |
| 2,6-Di-tertiary butyl-p-cresol | 1.0 |

| Epoxy resin composition B | Parts by weight |
| --- | --- |
| Alicyclic epoxy resin [3,4-epoxy-cyclohexylmethyl 3,4-epoxy-cyclohexanecarboxylate] | 100 |
| Methylhexahydrophthalic anhydride | 122 |
| 2-Ethyl-4-methylimidazole | 2.0 |
| 2,6-Di-tertiary butyl-p-cresol | 1.0 |

The pencil hardness of the transparent substrate obtained was 9H, and the substrate was excellent in abrasion or scratching, and no scratches were found even after the surface was rubbed 100 times with steel wool.

Example 4

A radiation-curable resin having the same recipe as in Example 1 was applied to one side of a glass plate by means of a bar coater, dried and irradiated with ultraviolet rays from a high pressure mercury lamp to form a coating film having a thickness of 7 $\mu$ on the glass plate.

Separately, an aqueous melamine resin solution having a resin content of 40% by weight was applied to one side of another glass plate by means of a bar coater, dried at 90° C. for 1 hour, and then heat-cured at 150° C. for 1 hour to obtain a coating film having a thickness of 5 $\mu$.

The two glass plates having formed therein the coating film were placed so that the coating films faced each other, and three sides of the plates were sealed with a spacer to form a casting mold. The epoxy resin composition of Example 1 was cast into the mold and heat-cured at 100° C. for 3 hours, and then released from the mold.

Consequently, the one side of the cured product of the epoxy resin composition had transferred thereto the radiation-curable resin layer and the other side had transferred thereto the melamine resin cured layer.

Both surfaces of the cured transparent substrate thus obtained had excellent resistance to abrasion or scratching, and no scratches were found even after the surfaces were rubbed 100 times with steel wool.

What is claimed is:

1. A process for producing an optical recording medium, comprising an epoxy resin substrate having hard coating layers formed on both sides thereof, which process comprises:
   (i) the step of coating and drying a solution containing a radiation-curable resin composition on one side of each of two glass plates having surface flatness and subjecting the coating films to radiation to cure them,
   (ii) the step of arranging the two glass plates having the cured coating films so that the coating films face each other, and sealing three sides of the two glass plates with a spacer to form a liquid-casting mold having a cavity;
   (iii) the step of casting into the cavity of the mold an epoxy resin composition comprising an alicyclic epoxy resin or a mixture of an alicyclic epoxy resin and an aromatic epoxy resin, an organic polybasic acid anhydride, a curing accelerator, and an anti-discoloring agent, and heat-curing the epoxy resin composition to integrate it with the coating films and provide a three-layer transparent optical recording medium within the mold, and
   (iv) the step of recovering the integrated transparent three-layer product from the mold to effect release between the glass faces and the coating films and to transfer the coating films to both sides of the cured epoxy resin substrate.

2. A process according to claim 1 wherein said cured coating films have a pencil hardness of at least 4H.

3. A process according to claim 1 wherein the thickness of the cured coating films are each 5-15 microns.

4. A process according to claim 1 wherein said radiation-curable resin composition and said epoxy resin composition are pre-selected so that after curing said cured coating films and said cured epoxy resin substrate have indicies of refraction which are approximately the same.

5. A process according to claim 1, wherein two inner surfaces of the casting mold are coated with one kind of radiation-curable resin compositions.

6. A process according to claim 1, wherein two inner surfaces of the casting mold are coated with different kinds of radiation-curable resins.

7. A process according to claim 1, wherein the mixture of an alicyclic epoxy resin and an aromatic epoxy resin is a mixture of a major amount of an alicyclic epoxy resin and a minor amount of an aromatic resin.

* * * * *